US012669948B2

(12) United States Patent
Jeon et al.

(10) Patent No.: US 12,669,948 B2
(45) Date of Patent: Jun. 30, 2026

(54) MEMORY MODULE INCLUDING STORAGE DEVICES AND COMPUTING SYSTEM INCLUDING THE SAME

(71) Applicant: SK hynix Inc., Icheon-si (KR)

(72) Inventors: Jeong Ho Jeon, Icheon-si (KR); Seok Ho Seo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/414,915

(22) Filed: Jan. 17, 2024

(65) Prior Publication Data

US 2025/0036296 A1    Jan. 30, 2025

(30) Foreign Application Priority Data

Jul. 27, 2023    (KR) ........................ 10-2023-0098131

(51) Int. Cl.
*G06F 3/06*              (2006.01)
(52) U.S. Cl.
CPC .......... *G06F 3/0634* (2013.01); *G06F 3/0617* (2013.01); *G06F 3/0683* (2013.01)
(58) Field of Classification Search
CPC .............................. G06F 3/0634; G06F 3/0617
See application file for complete search history.

(56) References Cited

U.S. PATENT DOCUMENTS

| | | | |
|---|---|---|---|
| 2016/0300816 A1* | 10/2016 | Park ........................ | H01L 25/18 |
| 2017/0249091 A1* | 8/2017 | Hodes ................... | G06F 1/3296 |
| 2019/0145835 A1* | 5/2019 | Jadhav ................ | G06F 13/4022 |
| | | | 710/5 |
| 2019/0339755 A1* | 11/2019 | Chai ........................ | G06F 1/305 |
| 2022/0164021 A1* | 5/2022 | Egan ....................... | G06F 1/206 |
| 2024/0256159 A1* | 8/2024 | Lee ........................ | G06F 3/0619 |

FOREIGN PATENT DOCUMENTS

| | | |
|---|---|---|
| KR | 10-2016-0120630 A | 10/2016 |
| KR | 10-2019-0127173 A | 11/2019 |

* cited by examiner

*Primary Examiner* — Eric Cardwell

(57)            ABSTRACT

A memory module may include a first storage device, and a second storage device configured to receive information about a first temperature indicating an internal temperature of the first storage device and to change a threshold temperature from a first threshold temperature to a second threshold temperature different from the first threshold temperature based on the information, to enter a mode in which an internal temperature of the second storage device is controlled when the temperature of the second storage device is higher than the threshold temperature.

20 Claims, 13 Drawing Sheets

| | Temp1 | Temp2 | Temp3 | Temp_ave | Temp_offset | Throttling temperature | Th_max |
|---|---|---|---|---|---|---|---|
| Case1 | 36°C | 38°C | 37°C | 37°C | 0°C | 40°C | 45°C |
| Case2 | 35°C | 37°C | 39°C | 36°C | 3°C | 40°C -> 42°C | |
| Case3 | 35°C | 37°C | 40°C | 36°C | 4°C | 40°C -> 44°C | |
| Case4 | 34°C | 36°C | 40°C | 35°C | 5°C | 40°C -> 45°C | |
| Case5 | 32°C | 34°C | 40°C | 33°C | 7°C | 40°C -> 45°C | |
| Case6 | 30°C | 32°C | 39°C | 31°C | 8°C | 40°C -> 45°C | |

FIG. 5

| | Temp1 | Temp2 | Temp3 | Temp_ave | Temp_offset | Shutdown temperature | Sd_max |
|---|---|---|---|---|---|---|---|
| Case1 | 61°C | 63°C | 62°C | 62°C | 0°C | 65°C | 70°C |
| Case2 | 60°C | 62°C | 64°C | 61°C | 3°C | 65°C -> 67°C | |
| Case3 | 60°C | 62°C | 65°C | 61°C | 4°C | 65°C -> 69°C | |
| Case4 | 59°C | 61°C | 65°C | 60°C | 5°C | 65°C -> 70°C | |
| Case5 | 57°C | 59°C | 65°C | 58°C | 7°C | 65°C -> 70°C | |
| Case6 | 54°C | 58°C | 64°C | 56°C | 8°C | 65°C -> 70°C | |

MEMORY MODULE INCLUDING STORAGE DEVICES AND COMPUTING SYSTEM INCLUDING THE SAME

CROSS-REFERENCE TO RELATED APPLICATION

The present application claims priority under 35 U.S.C. § 119(a) to Korean patent application number 10-2023-0098131 filed on Jul. 27, 2023, in the Korean Intellectual Property Office, the entire disclosure of which is incorporated by reference herein.

BACKGROUND

1. Technical Field

Various embodiments of the present disclosure generally relate to an electronic device, and more particularly to a memory module including storage devices and a computing system including the memory module.

2. Related Art

A storage device is a device that stores data under the control of a host device, such as a computer or a smartphone. The storage device may include a memory device in which data is stored and a memory controller that controls the memory device. Such memory devices are classified into volatile memory devices and nonvolatile memory devices.

A nonvolatile memory device is a memory device in which stored data is retained even when power supply is interrupted. Examples of nonvolatile memory devices include a read only memory (ROM), a programmable ROM (PROM), an electrically programmable ROM (EPROM), an electrically erasable and programmable ROM (EEPROM), and a flash memory.

The temperature of the storage device may increase when an operation of storing or reading data is performed. When the temperature of the storage device increases to threshold temperature (e.g., a critical temperature) or higher, the storage device may enter a throttling mode or a shutdown mode to decrease the temperature.

SUMMARY

Various embodiments of the present disclosure are directed to a memory module in which storage devices share temperatures with each other, and a computing system including the memory module.

An embodiment of the present disclosure may provide for a memory module. The memory module may include a first storage device, and a second storage device configured to receive information about a first temperature indicating an internal temperature of the first storage device. configured to change a threshold temperature from a first threshold temperature to a second threshold temperature different from the first threshold temperature based on the information, and configured to enter a mode in which an internal temperature of the second storage device is controlled when the temperature of the second storage device is higher than the threshold temperature.

An embodiment of the present disclosure may provide for a memory module. The memory module may include a first storage device, and a second storage device configured to receive information about a first temperature indicating an internal temperature of the first storage device and to change, based on the information, a throttling temperature at which a throttling operation is performed from a first throttling temperature to a second throttling temperature that is different from the first throttling temperature.

An embodiment of the present disclosure may provide for a computing system. The computing system may include a first storage device, a second storage device, and a host configured to receive temperature information indicating internal temperatures of the first and second storage devices and to provide a threshold temperature change request to the second storage device, wherein the threshold temperature change request is used to request a change of a threshold temperature at which the second storage device enters a mode to control the internal temperature of the second storage device, based on the internal temperature of the first storage device.

BRIEF DESCRIPTION OF THE DRAWINGS

FIG. 1 is a diagram illustrating a memory module including storage devices and a computing system including the memory module and a host according to an embodiment of the disclosure.

FIG. 3 is a diagram illustrating an operation in which any one storage device controls the temperature of a corresponding storage device based on the temperatures of other storage devices according to an embodiment of the disclosure.

FIG. 4 is a diagram illustrating changes in throttling temperature based on the temperatures of a plurality of storage devices according to embodiments of the disclosure.

FIG. 5 is a diagram illustrating changes in shutdown temperature based on the temperatures of a plurality of storage devices according to embodiments of the disclosure.

DETAILED DESCRIPTION

Figure 2:
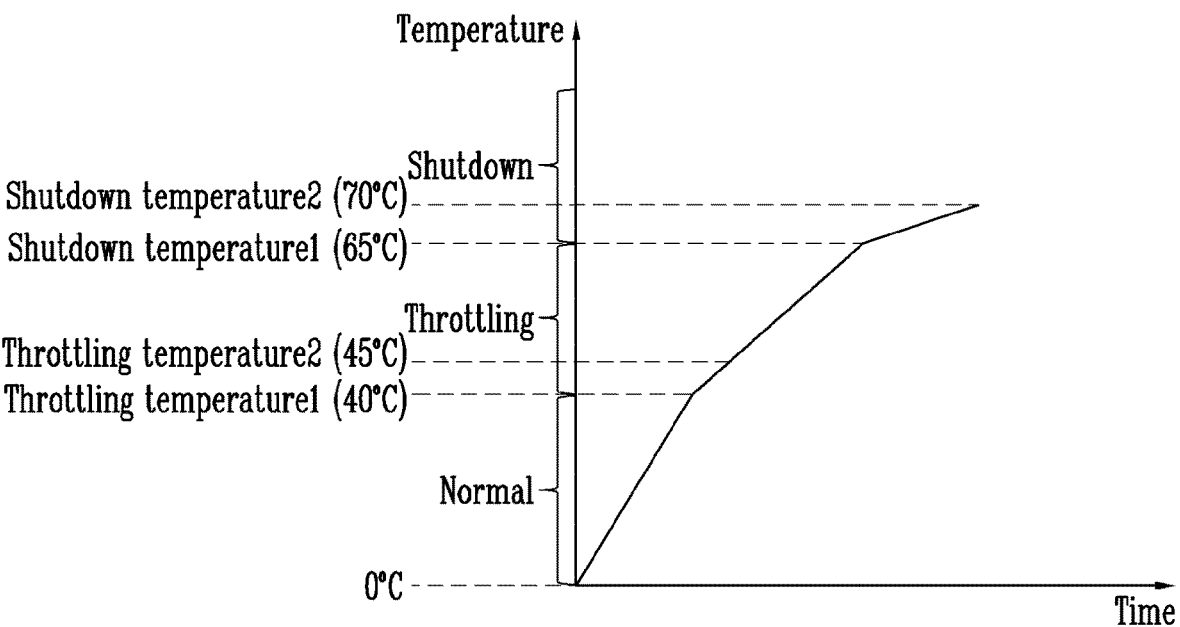
FIG. 2 is a diagram illustrating a throttling operation and a shutdown operation of a storage device.

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Figure 1:
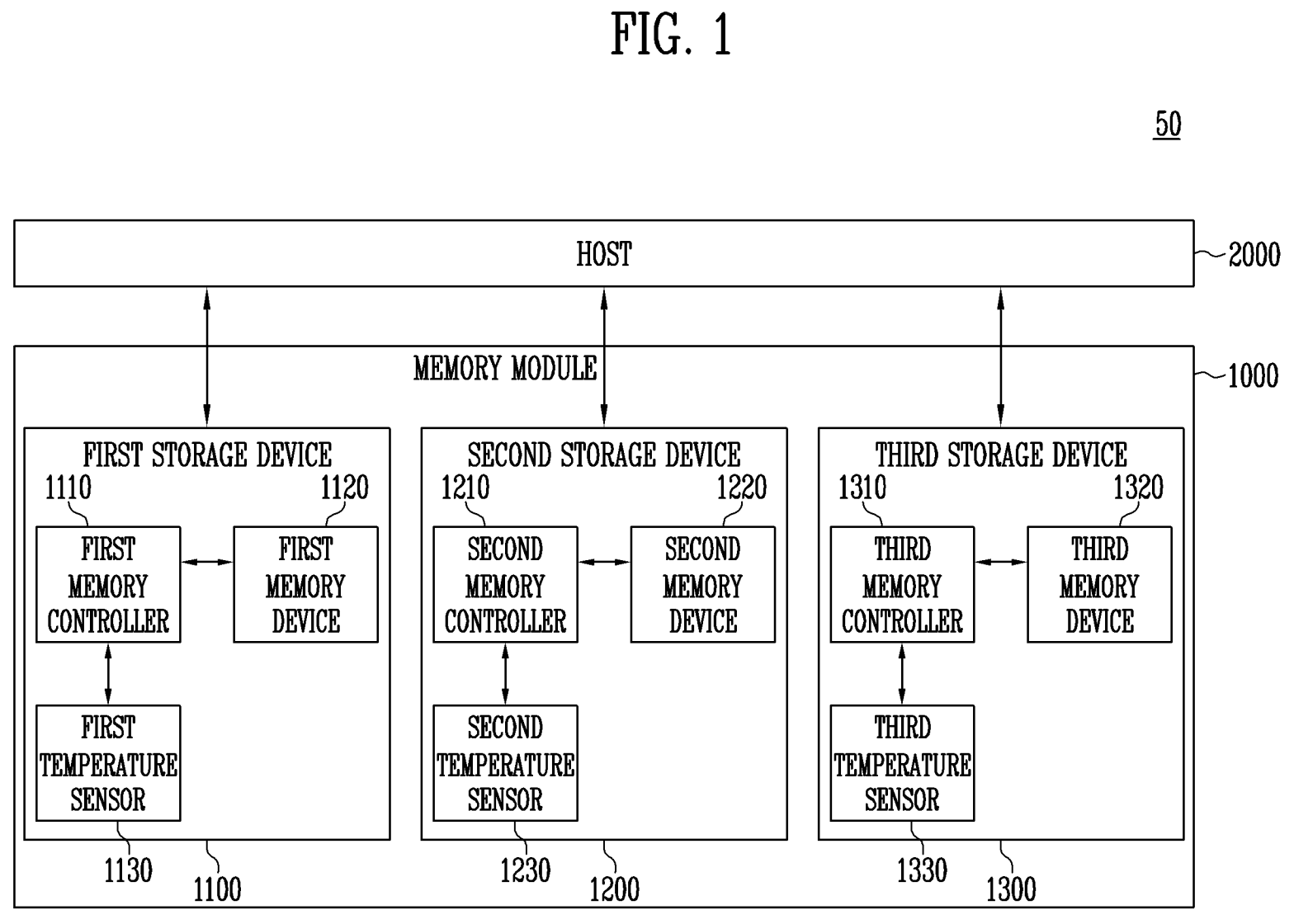

FIG. 1 is a diagram illustrating a memory module including storage devices and a computing system including the memory module and a host according to an embodiment of the disclosure.

Referring to FIG. 1, a computing system 50 may include a memory module 1000 and a host 2000. In an embodiment, the computing system 50 may be included in a mobile phone, a computer, an in-vehicle infotainment system, or the like.

The memory module 1000 may include a plurality of storage devices. In an embodiment, the memory module 1000 may include a first storage device 1100, a second storage device 1200, and a third storage device 1300. Although, in FIG. 1, the memory module 1000 is illustrated as including three storage devices, the memory module 1000 may include two or fewer or four or more storage devices in other embodiments.

In an embodiment, respective storage devices may be coupled to the host 2000 through independent ports (not illustrated). The respective storage devices may independently communicate with the host 2000 through the ports. Each storage device may store data under the control of the host 2000.

Each storage device may be manufactured as various types of storage devices such as a solid state drive (SSD) and universal flash storage (UFS), depending on a host interface that is a scheme for communication with the host 2000. Each storage device may be manufactured in various types of package forms such as a system on chip (SOC).

Each of the plurality of storage devices may include a memory controller, a memory device, and a temperature sensor. In an embodiment, the first storage device 1100 may include a first memory controller 1110, a first memory device 1120, and a first temperature sensor 1130.

The first memory device 1120 may store data. The first memory device 1120 may be operated under the control of the first memory controller 1110. In an embodiment, the first memory device 1120 may be a nonvolatile memory device or a volatile memory device.

The first memory device 1120 may receive a command and an address from the first memory controller 1110 and perform an operation indicated by the command on an area selected by the address. The first memory device 1120 may perform a program operation (write operation) of storing data in an area selected by the address, a read operation of reading data from the selected area, or an erase operation of erasing data stored in the selected area.

The first memory controller 1110 may control the overall operation of the first storage device 1100.

When power is applied to the first storage device 1100, the first memory controller 1110 may run firmware (FW). In an embodiment, the first memory controller 1110 may control communication between the host 2000 and the first memory device 1120 by running the firmware. In an embodiment, the first memory controller 1110 may translate the logical address from the host into the physical address of the first memory device.

The first memory controller 1110 may receive a request from the host 2000, and may control the first memory device 1120 to perform a program operation, a read operation or an erase operation in response to the request. The first memory controller 1110 may provide a command, a physical address or data to the first memory device 1120 depending on the write operation, the read operation or the erase operation.

In an embodiment, the first memory controller 1110 may internally generate a command, an address, and data regardless of whether a request from the host 2000 is received, and may transmit the command, address and data to the first memory device 1120. For example, the first memory controller 1110 may provide the first memory device 1120 with commands, addresses, and data that are required for performing read operations and program operations associated with performance of wear leveling, read reclaim, garbage collection, etc.

In an embodiment, the first memory controller 1110 may control at least two first memory devices 1120. In this case, the first memory controller 1110 may control the first memory devices 1120 using an interleaving scheme to improve operating performance. The interleaving scheme may be a scheme for controlling the first memory devices 1120 so that the operations of at least two first memory devices 1120 overlap each other.

The first temperature sensor 1130 may measure the temperature of the first storage device 1100. The first temperature sensor 1130 may provide first temperature information, including a first temperature that indicates the temperature of the first storage device, to the first memory controller 1110. The first temperature sensor 1130 may periodically measure the first temperature. The first temperature sensor 1130 may periodically provide the first temperature information to the first memory controller 1110. The first memory controller 1110 may provide the first temperature information to the host 2000 in response to a request of the host 2000. In an embodiment, the first temperature sensor 1130 may be located inside the first memory controller 1110. In another embodiment, the first temperature sensor 1130 may be located inside the first memory device 1120.

In an embodiment, the second storage device 1200 may include a second memory controller 1210, a second memory device 1220, and a second temperature sensor 1230. The third storage device 1300 may include a third memory controller 1310, a third memory device 1320, and a third temperature sensor 1330.

The second memory controller 1210 and the third memory controller 1310 may operate in the same manner as the first memory controller 1110. The second memory controller 1210 may control the operation of the second storage device 1200 in response to a request from the host 2000. The third memory controller 1310 may control the operation of the third storage device 1300 in response to a request from the host 2000.

The second memory device 1220 and the third memory device 1320 may be operated in the same manner as the first memory device 1120. The second memory device 1220 may perform an operation under the control of the second memory controller 1210. The third memory device 1320 may perform an operation under the control of the third memory controller 1310.

The second temperature sensor 1230 and the third temperature sensor 1330 may be operated in the same manner as the first temperature sensor 1130. The second temperature sensor 1230 may measure the temperature of the second storage device 1200. The second temperature sensor 1230 may provide second temperature information, including a second temperature indicating the temperature of the second storage device, to the second memory controller 1210. The second memory controller 1210 may provide the second temperature information to the host 2000.

The third temperature sensor 1330 may measure the temperature of the third storage device 1300. The third temperature sensor 1330 may provide third temperature information, including a third temperature indicating the temperature of the third storage device, to the third memory controller 1310. The third memory controller 1310 may provide the third temperature information to the host 2000.

The host 2000 may communicate with the first storage device 1100, the second storage device 1200, and the third storage device 1300 using various communication schemes.

FIG. 2 is a diagram illustrating a throttling operation and a shutdown operation of a storage device.

In FIG. 2, the horizontal axis of the graph denotes time, and the vertical axis of the graph denotes temperature.

Referring to FIG. 2, each of the first to third storage devices 1100 to 1300 illustrated in FIG. 1 may enter a throttling mode or a shutdown mode based on temperatures received from first to third temperature sensors 1130 to 1330. Each of the first to third storage devices 1100 to 1300 may perform a throttling operation in the throttling mode. When entering the throttling mode or the shutdown mode, the speed or rate at which the temperature of each of the first to third storage devices 1100 to 1300 decreases or increases may be reduced.

In an embodiment, when the temperature of each of the first to third storage devices 1100 to 1300 is lower than a first throttling temperature (Throttling temperature 1), a corresponding one of the first to third storage devices 1100 to 1300 may be operated in a normal mode Normal. The normal mode may be a mode in which the first to third storage devices 1100 to 1300 perform operations normally in response to a request from host 2000.

In an embodiment, when the temperature of each of the first to third storage devices 1100 to 1300 is equal to or higher than the first throttling temperature (Throttling temperature 1), a corresponding one of the first to third storage devices 1100 to 1300 may enter the throttling mode Throttling. The throttling mode may be a mode in which the temperatures of the first to third storage devices 1100 to 1300 are controlled. In the throttling mode, the first to third storage devices 1100 to 1300 may decrease the temperatures of the first to third storage devices 1100 to 1300 by performing a throttling operation.

The first throttling temperature (Throttling temperature 1) may be temperature at which the first to third storage devices 1100 to 1300 perform the throttling operation. In an embodiment, the first throttling temperature (Throttling temperature 1) may be 40° C. In an embodiment, when an internal temperature measured by each of the first to third temperature sensors 1130 to 1330 of the first to third storage devices 1100 to 1300 is equal to or higher than the first throttling temperature (Throttling temperature 1), a corresponding one of the first to third storage devices 1100 to 1300 may perform the throttling operation.

In an embodiment, the throttling operation may be an operation of controlling the operating performance of each of the first to third storage devices 1100 to 1300. In an embodiment, the throttling operation may be an operation of controlling the input/output speeds of data transmitted between the first to third memory controllers 1110 to 1310 and the first to third memory devices 1120 to 1320, which are respectively included in the first to third storage devices 1100 to 1300. The data input/output speeds may be controlled depending on the time required to perform a program operation and a read operation. In an embodiment, the first to third storage devices may decrease the input/output speeds of data when the temperatures of the first to third storage devices are equal to or higher than the first throttling temperature (Throttling temperature 1).

In an embodiment, the throttling operation may be an operation of controlling the number of memory devices simultaneously accessed by the first to third memory controllers 1110 to 1310 respectively included in the first to third storage devices 1100 to 1300. In an embodiment, each of the first to third memory controllers 1110 to 1310 may decrease the number of memory devices to be simultaneously accessed when the temperatures of the first to third storage devices 1100 to 1300 are equal to or higher than the first throttling temperature (Throttling temperature 1).

In an embodiment, the throttling operation may include operations of decreasing the temperatures of the first to third storage devices 1100 to 1300 in addition to the above-described operations. The temperatures of the first to third storage devices 1100 to 1300 may decrease, or increase slowly through the throttling operation.

In an embodiment, the first to third storage devices 1100 to 1300 may perform the throttling operation until the temperatures of the first to third storage devices 1100 to 1300 are lower than first shutdown temperature (Shutdown temperature 1). For example, the first shutdown temperature (Shutdown temperature 1) may be a temperature at which the first to third storage devices 1100 to 1300 enter a shutdown mode. In an embodiment, the first shutdown temperature (Shutdown temperature 1) may be 65° C. In an embodiment, the first to third storage devices 1100 to 1300 may enter the shutdown mode when the temperatures of the first to third storage devices 1100 to 1300 are equal to or higher than the first shutdown temperature (Shutdown temperature 1). In an embodiment, the first to third storage devices 1100 to 1300 may change the modes of the first to third storage devices to the shutdown mode when the temperatures of the first to third storage devices 1100 to 1300 are equal to or higher than the first shutdown temperature (Shutdown temperature 1).

In an embodiment, the shutdown mode may be a mode in which the temperatures of the first to third storage devices 1100 to 1300 are controlled. In the shutdown mode, the first to third storage devices 1100 to 1300 may perform only a minimum number of operations required for management. In the shutdown mode, the temperatures of the first to third storage devices 1100 to 1300 may decrease. In an embodiment, after entering the shutdown mode, each of the first to third storage devices 1100 to 1300 may not perform an operation corresponding to a request even though the request is received from the host. In an embodiment, the host may not transmit a request to the first to third storage devices 1100 to 1300 that have entered the shutdown mode.

In an embodiment, in the shutdown mode, each of the first to third storage devices 1100 to 1300 may set the mode thereof to a normal mode or a shutdown mode. In an embodiment, the first to third storage devices 1100 to 1300 may change the throttling temperature at which the throttling operation is performed from the first throttling temperature (Throttling temperature 1) to a second throttling temperature (Throttling temperature 2) that is higher than the first throttling temperature. In an embodiment, the second throttling temperature (Throttling temperature 2) may be 45° C. In an embodiment, after the throttling temperature has changed from the first throttling temperature (Throttling temperature 1) to the second throttling temperature (Throttling temperature 2), the first to third storage devices 1100 to 1300 may be operated in a normal mode when the temperatures of the first to third storage devices 1100 to 1300 are lower than the second throttling temperature (Throttling temperature 2). When the temperatures of the first to third storage devices 1100 to 1300 are equal to or higher than the second throttling temperature (Throttling temperature 2), the first to third storage devices 1100 to 1300 may enter the throttling mode in which the throttling operation is performed. In an embodiment, the first to third storage devices 1100 to 1300 may delay the time point at which the throttling operation is to be performed by changing the throttling temperature.

In an embodiment, the first to third storage devices 1100 to 1300 may change the shutdown temperature at which the storage devices enter the shutdown mode from the first shutdown temperature (Shutdown temperature 1) to a second shutdown temperature (Shutdown temperature 2) that is higher than the first shutdown temperature. In an embodiment, the second shutdown temperature (Shutdown temperature 2) may be 70° C. In an embodiment, after the shutdown temperature has changed from the first shutdown temperature (Shutdown temperature 1) to the second shutdown temperature (Shutdown temperature 2), the first to third storage devices 1100 to 1300 may not enter the shutdown mode when the temperatures of the first to third storage devices 1100 to 1300 are lower than the second shutdown temperature (Shutdown temperature 2). The first to third storage devices 1100 to 1300 may enter the shutdown mode when the temperatures of the first to third storage devices 1100 to 1300 are equal to or higher than the second shutdown temperature (Shutdown temperature 2). In an embodiment, the first to third storage devices 1100 to 1300 may delay the time point at which they enter the shutdown mode by changing the shutdown temperature.

Figure 3:
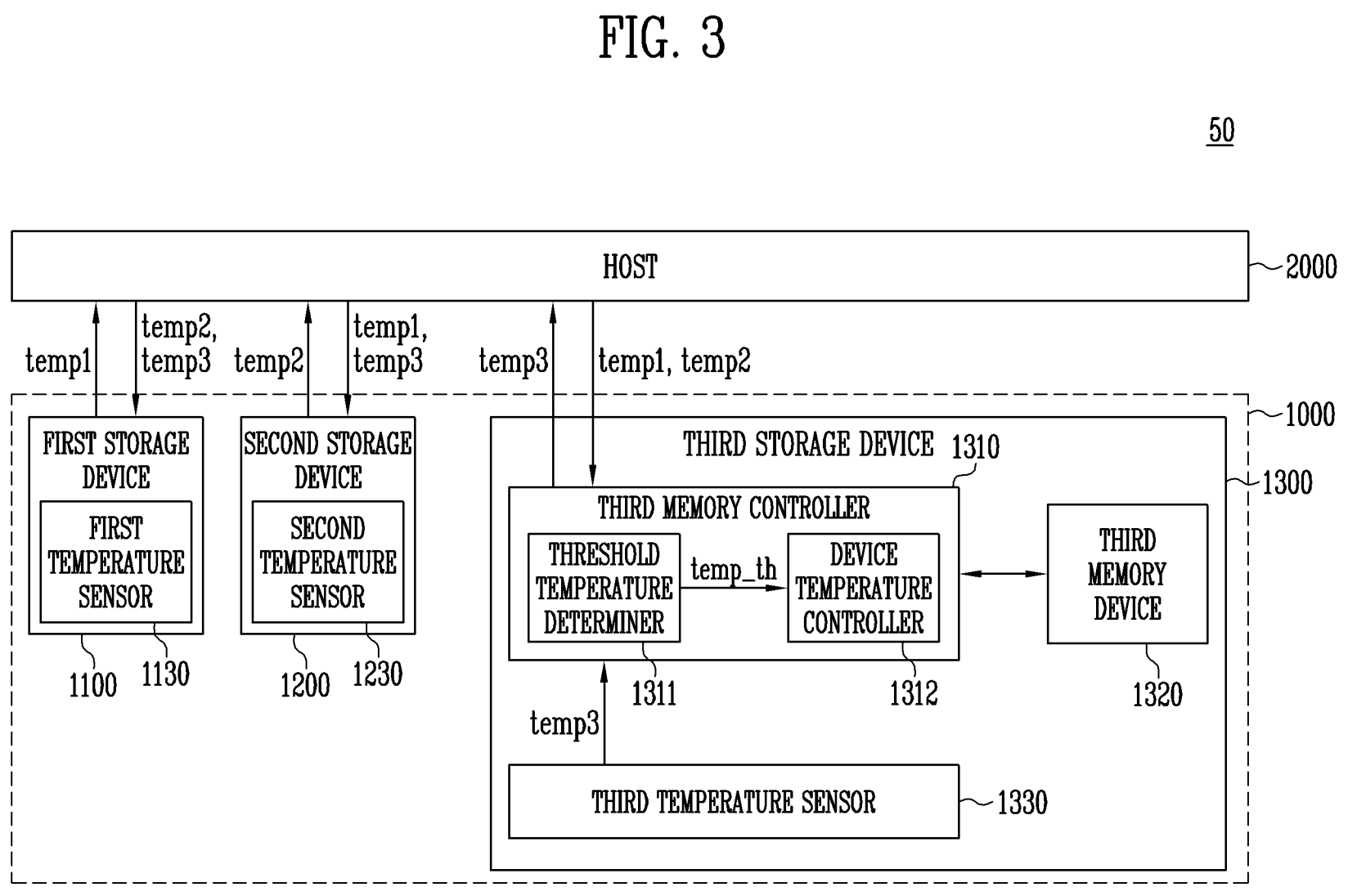

FIG. 3 is a diagram illustrating an operation in which any one storage device controls the temperature of a corresponding storage device based on the temperatures of other storage devices according to an embodiment of the disclosure.

In FIG. 3, an operation of a third storage device 1300 will be described by way of example. The operation of the third storage device 1300, which will be described later, may be equally applied to a first storage device 1100 and a second storage device 1200.

Referring to FIG. 3, a memory module 1000 may include the first storage device 1100, the second storage device 1200, and the third storage device 1300. The first storage device 1100 may provide first temperature information, including a first temperature temp1 indicating the internal temperature of the first storage device 1100, to the host 2000. The first storage device 1100 may receive, from the host 2000, second temperature information, including a second temperature temp2 indicating the internal temperature of the second storage device 1200, and third temperature information, including a third temperature temp3 indicating the internal temperature of the third storage device 1300.

The second storage device 1200 may provide the second temperature information including the second temperature temp2 measured by the second temperature sensor 1230 to the host 2000. The second storage device 1200 may receive the first temperature information including the first temperature temp1 and the third temperature information including the third temperature temp3 from the host 2000.

The third storage device 1300 may include a third memory controller 1310, a third memory device 1320, and a third temperature sensor 1330. The third temperature sensor 1330 may generate the third temperature information including the third temperature temp3 indicating the internal temperature of the third storage device 1300. The third memory controller 1310 may provide the third temperature information received from the third temperature sensor 1330 to the host 2000.

In an embodiment, the third memory controller 1310 may include a threshold temperature determiner 1311 and a device temperature controller 1312. The threshold temperature determiner 1311 may receive, from the host 2000, the first temperature information including the first temperature temp1 indicating the internal temperature of the first storage device 1100 and the second temperature information including the second temperature temp2 indicating the internal temperature of the second storage device 1200. The threshold temperature determiner 1311 may receive the third temperature information including the third temperature temp3 from the third temperature sensor 1330.

In an embodiment, the threshold temperature determiner 1311 may change threshold temperature (critical temperature) at which the third storage device 1300 enters a mode in which the temperature of the third storage device 1300 is controlled. In an example, the mode in which the temperature of the third storage device 1300 is controlled may be a throttling mode or a shutdown mode. In detail, the threshold temperature determiner 1311 may calculate the average temperature of the first temperature and the second temperature. The threshold temperature determiner 1311 may change threshold temperature temp_th based on the result of comparing the average temperature of the first temperature and the second temperature with the third temperature temp3. The threshold temperature temp_th may include a throttling temperature at which a corresponding storage device enters a throttling mode in which a throttling operation is performed, or a shutdown temperature at which a corresponding storage device enters a shutdown mode.

In an embodiment, the threshold temperature determiner 1311 may change the threshold temperature temp_th from a first threshold temperature to a second threshold temperature that is higher than the first threshold temperature when the third temperature temp3 is higher than the average temperature of the first temperature and the second temperature. The threshold temperature determiner 1311 may set the threshold temperature temp_th to the first threshold temperature when the third temperature temp3 is lower than or equal to the average temperature of the first temperature and the second temperature. The first threshold temperature may include a first throttling temperature or a first shutdown temperature. The second threshold temperature may include a second throttling temperature or a second shutdown temperature.

In an example, the threshold temperature determiner 1311 may change the throttling temperature from the first throttling temperature to the second throttling temperature that is higher than the first throttling temperature when the third temperature temp3 is higher than the average temperature of the first temperature and the second temperature. The threshold temperature determiner 1311 may set the throttling temperature to the first throttling temperature when the third temperature temp3 is lower than or equal to the average temperature of the first temperature and the second temperature. Thus, in some instances, the threshold temperature determiner 1311 may not change the throttling temperature. In an example, the threshold temperature determiner 1311 may change the shutdown temperature from the first shutdown temperature to the second shutdown temperature, which is higher than the first shutdown temperature, when the third temperature temp3 is higher than the average temperature of the first temperature and the second temperature. The threshold temperature determiner 1311 may set the shutdown temperature to the first shutdown temperature when the third temperature temp3 is lower than or equal to the average temperature of the first temperature and the second temperature. Thus, in some instances, the threshold temperature determiner 1311 may not change the shutdown temperature.

In an embodiment, the threshold temperature determiner 1311 may set the threshold temperature temp_th to be changed based on an offset temperature, which is the difference between the third temperature temp3 and the average of the first temperature and the second temperature. The threshold temperature determiner 1311 may set a temperature, obtained by adding the offset temperature to the third temperature temp3 or to the first threshold temperature, as the second threshold temperature.

In an example, the threshold temperature determiner 1311 may set a temperature, obtained by adding the offset temperature to the third temperature temp3 or to the first threshold temperature, as the second throttling temperature. In an example, the threshold temperature determiner 1311 may set a temperature, obtained by adding the offset temperature to the third temperature temp3 or to the first threshold temperature, as the second shutdown temperature.

In an embodiment, the threshold temperature determiner 1311 may set, as the second threshold temperature, the lower of the temperature obtained by adding the offset temperature to the third temperature temp3 or to the first threshold temperature and the maximum threshold temperature. The maximum threshold temperature may be a value indicating a temperature to which the threshold temperature can be maximally increased. The maximum threshold temperature may include a maximum throttling temperature or a maximum shutdown temperature. For example, the maximum throttling temperature may be 45° C., as illustrated in FIG. 2. In an example, the maximum shutdown temperature may be 70° C., as illustrated in FIG. 2.

The threshold temperature determiner 1311 may provide the threshold temperature temp_th to the device temperature controller 1312. In an embodiment, the threshold temperature determiner 1311 may provide the first threshold temperature to the device temperature controller 1312 when the third temperature temp3 is lower than or equal to the average of the first temperature and the second temperature. The threshold temperature determiner 1311 may provide the second threshold temperature to the device temperature controller 1312 when the third temperature temp3 is higher than the average of the first temperature and the second temperature.

The device temperature controller 1312 may control entry into the throttling mode or the shutdown mode. The device temperature controller 1312 may control the throttling operation performed in the throttling mode. In an embodiment, the device temperature controller 1312 may receive the third temperature temp3 and the threshold temperature temp_th. The device temperature controller 1312 may enter the throttling mode based on the result of comparing the third temperature temp3 with the threshold temperature temp_th. The device temperature controller 1312 may enter the throttling mode when the third temperature temp3 is equal to or higher than the threshold temperature temp_th. The device temperature controller 1312 may not enter the throttling mode when the third temperature temp3 is lower than the threshold temperature temp_th.

In an embodiment, the device temperature controller 1312 may receive the second throttling temperature from the threshold temperature determiner 1311. The device temperature controller 1312 may enter the throttling mode when the third temperature temp3 is equal to or higher than the second throttling temperature. The device temperature controller 1312 may change the mode of the third storage device from the normal mode to the throttling mode when the third temperature temp3 is equal to or higher than the second throttling temperature. Thereafter, the threshold temperature determiner 1311 may change the throttling temperature from the second throttling temperature to the first throttling temperature when the third temperature temp3 becomes lower than the first throttling temperature. After the third temperature has become lower than the first throttling temperature, the threshold temperature determiner 1311 may provide the first throttling temperature as the threshold temperature temp_th to the device temperature controller 1312.

In an embodiment, the device temperature controller 1312 may enter the shutdown mode based on the result of comparing the third temperature temp3 with the threshold temperature temp_th. When the third temperature temp3 is equal to or higher than the threshold temperature, the device temperature controller 1312 may control the third storage device 1300 to enter the shutdown mode. The device temperature controller 1312 may not enter the shutdown mode when the third temperature temp3 is lower than the threshold temperature temp_th.

In an embodiment, the device temperature controller 1312 may receive the second shutdown temperature from the threshold temperature determiner 1311. When the third temperature temp3 is equal to or higher than the second shutdown temperature, the device temperature controller 1312 may control the third storage device 1300 to enter the shutdown mode. The device temperature controller 1312 may change the mode of the third storage device to the shutdown mode.

Thereafter, the device temperature controller 1312 may change the mode of the third storage device from the shutdown mode to the normal mode based on the first temperature temp1 and the second temperature temp2. In an embodiment, when the average of the first temperature and the second temperature is lower than the first throttling temperature, the device temperature controller 1312 may change the mode of the third storage device from the shutdown mode to the normal mode. The first throttling temperature may be a temperature at which the third storage device 1300 enters a throttling mode in which the third temperature, which is an internal temperature, is controlled. When the mode of the third storage device has changed to the normal mode, the third storage device 1300 may normally perform an operation corresponding to a request received from the host 2000 in response to the request. In an embodiment, when the mode of the third storage device has changed to the normal mode, the threshold temperature determiner 1311 may change the shutdown temperature from the second shutdown temperature to the first shutdown temperature. In an embodiment, the threshold temperature determiner 1311 may change the shutdown temperature from the second shutdown temperature to the first shutdown temperature when the third temperature temp3 becomes lower than the first throttling temperature.

FIG. 4 is a diagram illustrating changes in throttling temperature based on the temperatures of a plurality of storage devices according to embodiments of the disclosure.

FIG. 4 will be described with reference to FIGS. 2 and 3. Referring to FIG. 4, a third storage device 1300 may change a throttling temperature from a first throttling temperature to a second throttling temperature based on a first temperature Temp1 indicating the temperature of a first storage device, a second temperature Temp2 indicating the temperature of a second storage device, and a third temperature Temp3 indicating the temperature of the third storage device.

First, in Case1, the threshold temperature determiner 1311 may receive a first temperature of 36° C., a second temperature of 38° C., and a third temperature of 37° C. The threshold temperature determiner 1311 may calculate the average temperature Temp_ave (37° C.) of the first temperature and the second temperature. Because the third temperature temp3 of 37° C. is equal to the average temperature of 37° C., the threshold temperature determiner 1311 may set the throttling temperature to the first throttling temperature. That is, in Case1, the threshold temperature determiner 1311 does not change the throttling temperature at which a throttling operation is performed. In an embodiment, the first throttling temperature may be 40° C.

In Case2, the threshold temperature determiner 1311 may receive a first temperature of 35° C., a second temperature of 37° C., and a third temperature of 39° C. The threshold temperature determiner 1311 may calculate the average temperature (36° C.) of the first temperature and the second temperature. Because the third temperature of 39° C. is higher than the average temperature (36° C.) of the first temperature and the second temperature, the threshold temperature determiner 1311 may change the throttling temperature. The threshold temperature determiner 1311 may set an offset temperature Temp_offset of 3° C., which is the difference between the third temperature of 39° C. and the average temperature (36° C.) of the first temperature and the second temperature. The threshold temperature determiner 1311 may set the second throttling temperature at 42° C. temperature, which is obtained by adding the offset temperature of 3° C. to the third temperature of 39° C. The threshold temperature determiner 1311 may change the throttling temperature from the first throttling temperature to the second throttling temperature (40° C.->42° C.). After the throttling temperature has changed to 42° C., which is the second throttling temperature, the device temperature controller 1312 may enter the throttling mode in which a throttling operation is performed when the third temperature temp3 is equal to or higher than 42° C.

In Case3, the threshold temperature determiner 1311 may receive a first temperature of 35° C., a second temperature of 37° C., and a third temperature of 40° C. The threshold temperature determiner 1311 may calculate the average temperature (36° C.) of the first temperature and the second temperature. Because the third temperature of 40° C. is higher than the average temperature (36° C.) of the first temperature and the second temperature, the threshold temperature determiner 1311 may change the throttling temperature. The threshold temperature determiner 1311 may set an offset temperature of 4° C., which is the difference between the third temperature of 40° C. and the average temperature (36° C.) of the first temperature and the second temperature. The threshold temperature determiner 1311 may set the second throttling temperature at 44° C., which is obtained by adding the offset temperature of 4° C. to the third temperature of 40° C. The threshold temperature determiner 1311 may change the throttling temperature from the first throttling temperature to the second throttling temperature (40° C.->44° C.). The threshold temperature determiner 1311 may delay the time at which a device enters the throttling mode by changing the throttling temperature from the first throttling temperature of 40° C. to the second throttling temperature of 44° C., even though the third temperature of 40° C. is equal to the first throttling temperature 40° C.

In Case4, the threshold temperature determiner 1311 may receive a first temperature of 34° C., a second temperature of 36° C., and a third temperature of 40° C. The threshold temperature determiner 1311 may calculate the average temperature (35° C.) of the first temperature and the second temperature. Because the third temperature of 40° C. is higher than the average temperature (35° C.) of the first temperature and the second temperature, the threshold temperature determiner 1311 may change the throttling temperature. The threshold temperature determiner 1311 may set an offset temperature of 5° C., which is the difference between the third temperature of 40° C. and the average temperature (35° C.) of the first temperature and the second temperature. The threshold temperature determiner 1311 may set the second throttling temperature at 45° C., which is obtained by adding the offset temperature of 5° C. to the third temperature of 40° C. The threshold temperature determiner 1311 may change the throttling temperature from the first throttling temperature to the second throttling temperature (40° C.->45° C.).

In Case5, the threshold temperature determiner 1311 may receive a first temperature of 32° C., a second temperature of 34° C., and a third temperature of 40° C. The threshold temperature determiner 1311 may calculate the average temperature (33° C.) of the first temperature and the second temperature. Because the third temperature of 40° C. is higher than the average temperature (33° C.) of the first temperature and the second temperature, the threshold temperature determiner 1311 may change the throttling temperature. The threshold temperature determiner 1311 may set an offset temperature of 7° C., which is the difference between the third temperature of 40° C. and the average temperature (33° C.) of the first temperature and the second temperature. The threshold temperature determiner 1311 may set, as the second throttling temperature, the lower of a temperature of 47° C., obtained by adding the offset temperature of 7° C. to the third temperature of 40° C., and a maximum throttling temperature Th_max. The threshold temperature determiner 1311 may limit the throttling temperature to the maximum throttling temperature Th_max to prevent the malfunction of the third storage device 1300. In an embodiment, the maximum throttling temperature may be 45° C. Because a temperature of 47° C., obtained by adding the offset temperature of 7° C. to the third temperature of 40° C., is higher than the maximum throttling temperature of 45° C., the threshold temperature determiner 1311 may set the second throttling temperature to the maximum throttling temperature of 45° C. The threshold temperature determiner 1311 may change the throttling temperature from the first throttling temperature to the second throttling temperature (40° C.->45° C.).

In Case6, the threshold temperature determiner 1311 may receive a first temperature of 30° C., a second temperature of 32° C., and a third temperature of 39° C. The threshold temperature determiner 1311 may calculate the average temperature (31° C.) of the first temperature and the second temperature. Because the third temperature of 39° C. is higher than the average temperature (31° C.) of the first temperature and the second temperature, the threshold temperature determiner 1311 may change the throttling temperature. The threshold temperature determiner 1311 may set an offset temperature of 8° C., which is the difference between the third temperature of 39° C. and the average temperature (31° C.) of the first temperature and the second temperature. The threshold temperature determiner 1311 may set, as the second throttling temperature, the lower of a temperature of 47° C., obtained by adding the offset temperature of 8° C. to the third temperature of 39° C., and the maximum throttling temperature of 45° C. The threshold temperature determiner 1311 may change the throttling temperature from the first throttling temperature to the second throttling temperature (40° C.->45° C.). The threshold temperature determiner 1311 may provide the second throttling temperature of 45° C. to the device temperature controller 1312. The device temperature controller 1312 may enter the throttling mode based on the result of comparing the third temperature temp3 with the second throttling temperature of 45° C.

In an embodiment, the temperature of any one storage device may be higher than those of other storage devices. Therefore, while one storage device may first perform a throttling operation, and other storage devices may perform the throttling operation at a later time. In an embodiment, one storage device may delay the time at which the throttling operation is to be performed by changing the throttling temperature so that all of the storage devices perform throttling operations at the same time.

FIG. 5 is a diagram illustrating changes in shutdown temperature based on the temperatures of a plurality of storage devices according to embodiments of the disclosure.

FIG. 5 will be described with reference to FIGS. 2 and 3. Referring to FIG. 5, a third storage device 1300 may change a shutdown temperature from a first shutdown temperature to a second shutdown temperature based on first temperature Temp1 that indicates the temperature of the first storage device, second temperature Temp2 that indicates the temperature of the second storage device, and third temperature Temp3 that indicates the temperature of the third storage device.

In Case1, the threshold temperature determiner 1311 may receive a first temperature of 61° C., a second temperature of 63° C., and a third temperature of 62° C. The threshold temperature determiner 1311 may calculate the average temperature Temp_ave (62° C.) of the first temperature and the second temperature. Because the third temperature temp3 of 62° C. is equal to the average temperature of 62° C., the threshold temperature determiner 1311 may set the shutdown temperature to the first shutdown temperature. That is, the shutdown temperature at which the corresponding storage device enters a shutdown mode is not changed. In an embodiment, the first shutdown temperature may be 65° C.

In Case2, the threshold temperature determiner 1311 may receive a first temperature of 60° C., a second temperature of 62° C., and a third temperature of 64° C. The threshold temperature determiner 1311 may calculate the average temperature (61° C.) of the first temperature and the second temperature. Because the third temperature of 64° C. is higher than the average temperature (61° C.) of the first temperature and the second temperature, the threshold temperature determiner 1311 may change the shutdown temperature. The threshold temperature determiner 1311 may set an offset temperature Temp_offset of 3° C., which is the difference between the third temperature of 64° C. and the average temperature (61° C.) of the first temperature and the second temperature. The threshold temperature determiner 1311 may set a temperature, obtained by adding the offset temperature of 3° C. to the third temperature of 64° C., as the second shutdown temperature of 67° C. The threshold temperature determiner 1311 may change the shutdown temperature from the first shutdown temperature to the second shutdown temperature (65° C.->67° C.). When the third temperature Temp3 is equal to or higher than 67° C., after the shutdown temperature has changed to the second shutdown temperature of 67° C., the device temperature controller 1312 may control the third storage device 1300 to enter the shutdown mode.

In Case3, the threshold temperature determiner 1311 may receive a first temperature of 60° C., a second temperature of 62° C., and a third temperature of 65° C. The threshold temperature determiner 1311 may calculate the average temperature (61° C.) of the first temperature and the second temperature. Because the third temperature of 65° C. is higher than the average temperature (61° C.) of the first temperature and the second temperature, the threshold temperature determiner 1311 may change the shutdown temperature. The threshold temperature determiner 1311 may set an offset temperature of 4° C., which is the difference between the third temperature of 65° C. and the average temperature (61° C.) of the first temperature and the second temperature. The threshold temperature determiner 1311 may set a temperature, obtained by adding the offset temperature of 4° C. to the third temperature of 65° C., as the second shutdown temperature of 69° C. The threshold temperature determiner 1311 may change the shutdown temperature from the first shutdown temperature to the second shutdown temperature (65° C.->69° C.). Therefore, the threshold temperature determiner 1311 may delay the entry of the third storage device 1300 into shutdown mode by changing the shutdown temperature from the first shutdown temperature of 65° C. to the second shutdown temperature of 69° C., even though the third temperature of 65° C. is equal to the first shutdown temperature of 65° C.

In Case4, the threshold temperature determiner 1311 may receive a first temperature of 59° C., a second temperature of 61° C., and a third temperature of 65° C. The threshold temperature determiner 1311 may calculate the average temperature (60° C.) of the first temperature and the second temperature. Because the third temperature of 65° C. is higher than the average temperature (60° C.) of the first temperature and the second temperature, the threshold temperature determiner 1311 may change the shutdown temperature. The threshold temperature determiner 1311 may set offset temperature of 5° C., which is the difference between the third temperature of 65° C. and the average temperature (60° C.) of the first temperature and the second temperature. The threshold temperature determiner 1311 may set a temperature, obtained by adding the offset temperature of 5° C. to the third temperature of 65° C., as the second shutdown temperature of 70° C. The threshold temperature determiner 1311 may change the shutdown temperature from the first shutdown temperature to the second shutdown temperature (65° C.->70° C.).

In Case5, the threshold temperature determiner 1311 may receive a first temperature of 57° C., a second temperature of 59° C., and a third temperature of 65° C. The threshold temperature determiner 1311 may calculate the average temperature (58° C.) of the first temperature and the second temperature. Because the third temperature of 65° C. is higher than the average temperature (58° C.) of the first temperature and the second temperature, the threshold temperature determiner 1311 may change the shutdown temperature. The threshold temperature determiner 1311 may set an offset temperature of 7° C., which is the difference between the third temperature of 65° C. and the average temperature (58° C.) of the first temperature and the second temperature. The threshold temperature determiner 1311 may set the second shutdown temperature using the lower of a temperature of 72° C., which is obtained by adding the offset temperature of 7° C. to the third temperature of 65° C., and a maximum shutdown temperature Sd_max. As a result, the shutdown temperature in Case5 does not exceed the maximum shutdown temperature Sd_max because the third storage device 1300 may malfunction without entering shutdown mode if the second shutdown temperature exceeds the maximum shutdown temperature Sd_max. In an embodiment, the maximum shutdown temperature may be 70° C. Because a temperature of 72° C., obtained by adding the offset temperature of 7° C. to the third temperature of 65° C., is higher than the maximum shutdown temperature of 70° C., the threshold temperature determiner 1311 may set the maximum shutdown temperature of 70° C. as the second shutdown temperature of 70° C. The threshold temperature determiner 1311 may change the shutdown temperature from the first shutdown temperature to the second shutdown temperature (65° C.->70° C.).

In Case6, the threshold temperature determiner 1311 may receive a first temperature of 54° C., a second temperature of 58° C., and a third temperature of 64° C. The threshold temperature determiner 1311 may calculate the average temperature (56° C.) of the first temperature and the second temperature. Because the third temperature of 64° C. is higher than the average temperature (56° C.) of the first temperature and the second temperature, the threshold temperature determiner 1311 may change the shutdown temperature. The threshold temperature determiner 1311 may set an offset temperature of 8° C., which is the difference between the third temperature of 64° C. and the average temperature (56° C.) of the first temperature and the second temperature. The threshold temperature determiner 1311 may set, as the second shutdown temperature, the lower temperature of a temperature of 72° C., obtained by adding the offset temperature of 8° C. to the third temperature of 64° C., and the maximum shutdown temperature of 70° C. The threshold temperature determiner 1311 may change the shutdown temperature from the first shutdown temperature to the second shutdown temperature (65° C.->70° C.). The threshold temperature determiner 1311 may provide the second shutdown temperature of 70° C. to the device temperature controller 1312. The device temperature controller 1312 may determine whether to enter the shutdown mode based on the result of comparing the third temperature Temp3 with the second shutdown temperature of 70° C.

Figure 6:
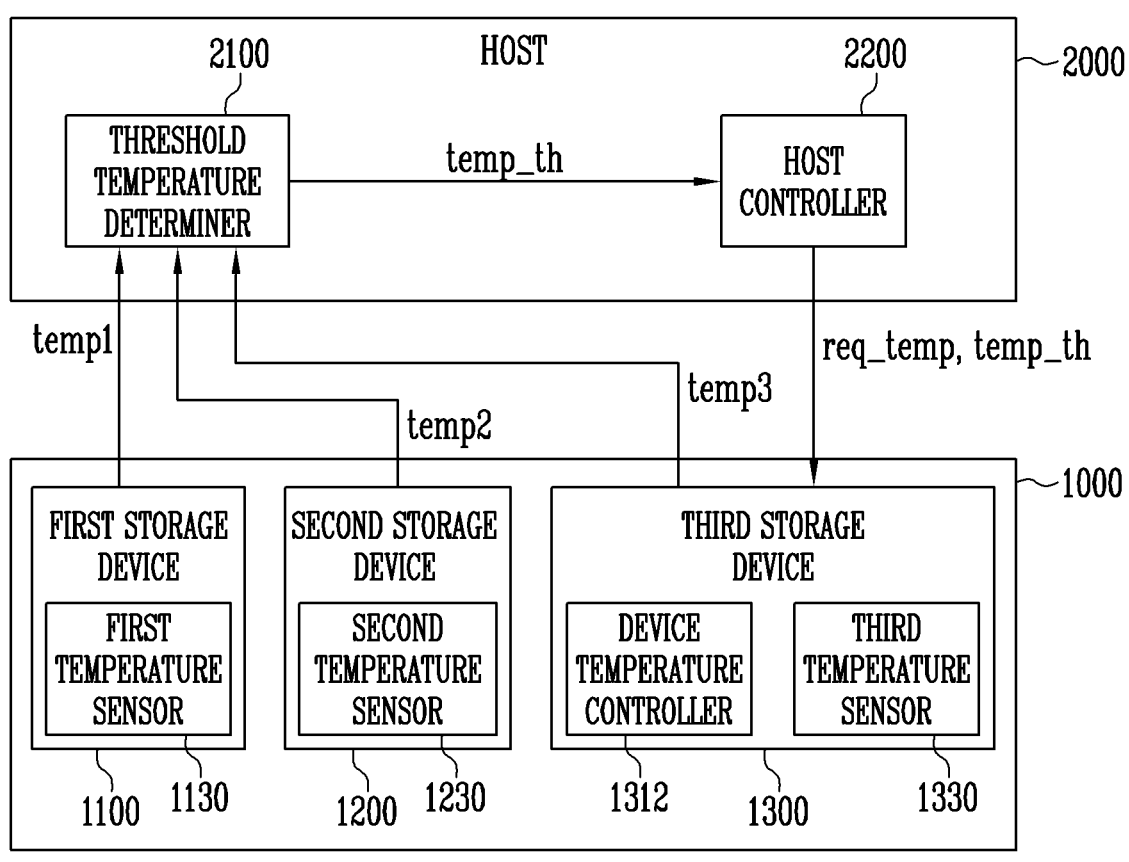
FIG. 6 is a diagram illustrating an operation in which a host controls the temperature of any one storage device based on the temperatures of a plurality of storage devices according to an embodiment of the disclosure.

FIG. 6 is a diagram illustrating an operation in which a host controls the temperature of any one storage device based on the temperatures of a plurality of storage devices according to an embodiment of the disclosure.

In FIG. 6, the host 2000 controls the temperature of the third storage device 1300, as an example. In other example, the host 2000 may control the temperatures of the second and third storage devices 1200 and 1300 in the same manner as the host controls the temperature of the third storage device 1300 in FIG. 6.

Referring to FIG. 6, the host 2000 may include a threshold temperature determiner 2100 and a host controller 2200. While in FIG. 3, the threshold temperature determiner 1311 may be a component included in the third storage device 1300, in contrast the threshold temperature determiner 2100 in FIG. 6 may be a component included in the host 2000.

The threshold temperature determiner 2100 may receive a first temperature information including first temperature temp1 indicating the internal temperature of the first storage device 1100, second temperature information including second temperature temp2 indicating the internal temperature of the second storage device 1200, and third temperature information including third temperature temp3 indicating the internal temperature of the third storage device 1300.

In an embodiment, the threshold temperature determiner 2100 may change a threshold temperature at which the third storage device 1300 enters a temperature control mode, in which the temperature of the third storage device 1300 is controlled from first threshold temperature to second threshold temperature. The change in the threshold temperature may be based on the result of comparing the first temperature temp1, the second temperature temp2, and the third temperature temp3. The temperature control mode, in which the temperature of the third storage device 1300 is controlled, may be a throttling mode or a shutdown mode. Depending on the mode, the first threshold temperature may be a first throttling temperature or a first shutdown temperature. The second threshold temperature may include a second throttling temperature or a second shutdown temperature.

The threshold temperature determiner 2100 may change the threshold temperature from the first threshold temperature to the second threshold temperature when the third temperature temp3 is higher than the average temperature of the first temperature and the second temperature. The threshold temperature determiner 2100 may not change the threshold temperature when the third temperature temp3 is lower than or equal to the average temperature of the first temperature and the second temperature.

The threshold temperature determiner 2100 may set the second threshold temperature using an offset temperature that is the difference between the third temperature temp3 and the average temperature of the first temperature and the second temperature. The threshold temperature determiner 2100 may set a temperature, obtained by adding the offset temperature to the third temperature temp3, as the second threshold temperature.

In an embodiment, the threshold temperature determiner 2100 may adjust the threshold temperature by setting the lower of a temperature, obtained by adding the offset temperature to the third temperature temp3, and a maximum threshold temperature, as the second threshold temperature. Depending on the temperature control mode, the maximum threshold temperature may be a maximum throttling temperature or a maximum shutdown temperature.

The threshold temperature determiner 2100 may provide the second threshold temperature to the host controller 2200 when the third temperature temp3 is higher than the average temperature of the first temperature temp1 and the second temperature temp2.

The host controller 2200 may control the temperatures of the first to third storage devices 1100 to 1300. In an embodiment, when the second threshold temperature is received from the threshold temperature determiner 2100, the host controller 2200 may provide a threshold temperature change request req_temp for requesting a change to the threshold temperature, together with the second threshold temperature, to the third storage device 1300. In response to the threshold temperature change request req_temp, the third storage device 1300 may change the threshold temperature, at which the third storage device 1300 enters a mode in which the temperature of the third storage device 1300 is controlled, from the first threshold temperature to the second threshold temperature.

The device temperature controller 1312 included in the third storage device 1300 may control the entry of the third storage device 1300 into a throttling mode or a shutdown mode based on a result of comparing the third temperature temp3 received from the third temperature sensor 1330 with the second threshold temperature.

In an embodiment, after changing the threshold temperature from the first threshold temperature to the second threshold temperature, the threshold temperature determiner 2100 may receive a third temperature temp3 that indicates that from the temperature of the third storage device 1300 is lower than the first threshold temperature. As a result, the threshold temperature determiner 2100 may change the threshold temperature from the second threshold temperature to the first threshold temperature. The threshold temperature determiner 2100 may provide the first threshold temperature to the host controller 2200 when the third temperature temp3 becomes lower than the first threshold temperature.

When the first threshold temperature is received from the threshold temperature determiner 2100, the host controller 2200 may provide a threshold temperature change request req_temp for requesting the change of threshold temperature, together with the first threshold temperature, to the third storage device 1300.

The third storage device 1300 may change the threshold temperature at which the third storage device 1300 enters the mode in which the temperature of the third storage device 1300 is controlled from the second threshold temperature to the first threshold temperature in response to the threshold temperature change request req_temp.

The device temperature controller 1312 may control entry into a throttling mode or a shutdown mode based on the result of comparing the third temperature temp3 received from the third temperature sensor 1330 with the first threshold temperature.

Figure 7:
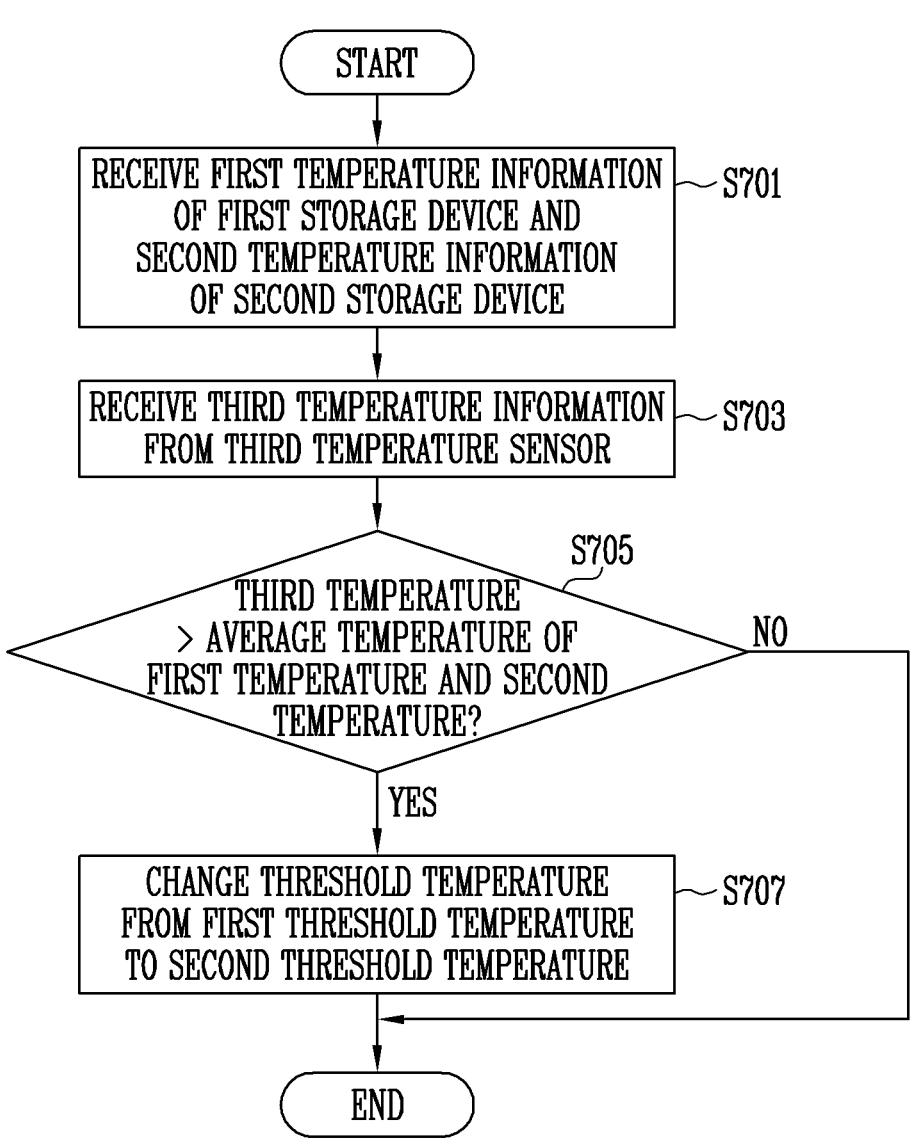
FIG. 7 is a flowchart illustrating an operation of changing threshold temperature based on the temperatures of a plurality of storage devices according to an embodiment of the disclosure.

FIG. 7 is a flowchart illustrating an operation of changing threshold temperature based on the temperatures of a plurality of storage devices according to an embodiment of the disclosure.

Referring to FIG. 7, at step S701, a third storage device 1300 may receive first temperature information including first temperature of a first storage device and second temperature information including second temperature of a second storage device.

At step S703, the third storage device 1300 may receive third temperature information including third temperature of the third storage device from a third temperature sensor.

At step S705, the third storage device 1300 may compare the third temperature with an average of the first temperature and the second temperature. When the third temperature is higher than the average of the first temperature and the second temperature, step S707 may be performed. The third storage device 1300 may not change the threshold temperature when the third temperature is lower than or equal to the average of the first temperature and the second temperature. The threshold temperature may be set to first threshold temperature.

At step S707, the third storage device 1300 may change the threshold temperature from the first threshold temperature to the second threshold temperature when the third temperature is higher than the average of the first temperature and the second temperature. The second threshold temperature may be higher than the first threshold temperature. The first threshold temperature may be a first throttling temperature or a first shutdown temperature. The second threshold temperature may be a second throttling temperature or a second shutdown temperature.

Figure 8:
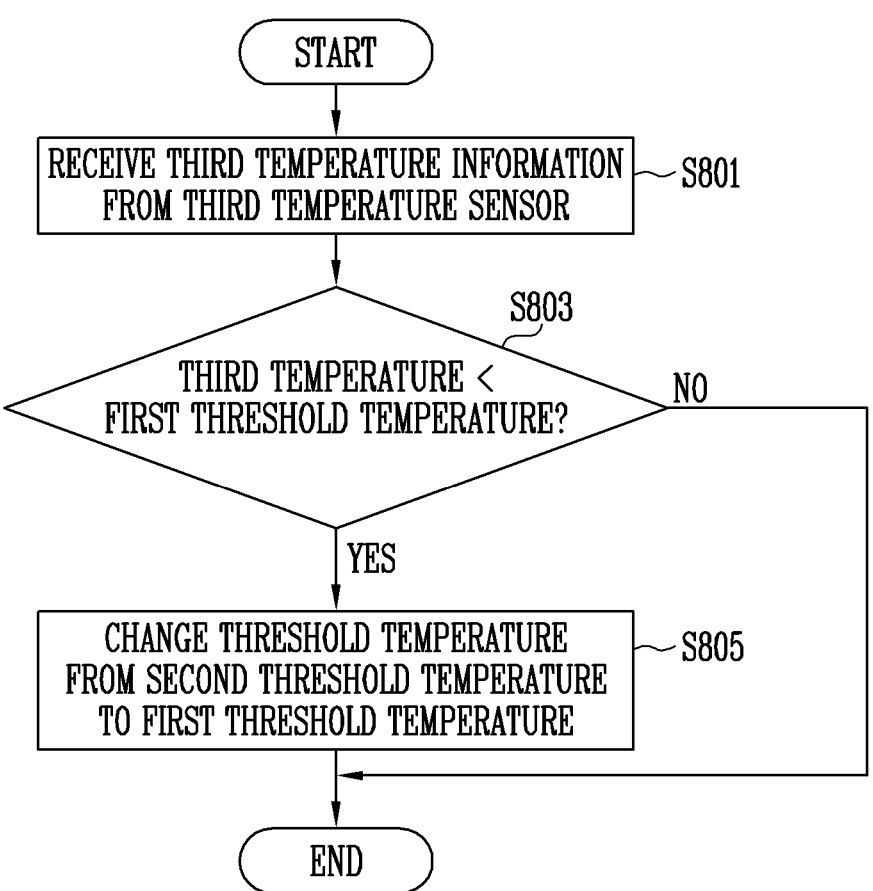
FIG. 8 is a flowchart illustrating an operation of changing threshold temperature based on the temperature of any one storage device according to an embodiment of the disclosure.

FIG. 8 is a flowchart illustrating an operation of changing threshold temperature based on the temperature of any one storage device according to an embodiment of the disclosure.

The steps illustrated in FIG. 8 may be performed after the threshold temperature has changed from a first threshold temperature to a second threshold temperature at step S707 of FIG. 7.

Referring to FIG. 8, at step S801, the third storage device 1300 may receive a third temperature information including third temperature from the third temperature sensor.

At step S803, the third storage device 1300 may compare the third temperature with the first threshold temperature. The first threshold temperature may be a first throttling temperature or a first shutdown temperature. The third storage device 1300 may not change the threshold temperature when the third temperature is equal to or higher than the first threshold temperature, and the threshold temperature may be set to second threshold temperature. When the third temperature is lower than the first threshold temperature, step S805 may be performed.

At step S805, the third storage device 1300 may change the threshold temperature from the second threshold temperature to the first threshold temperature when the third temperature is lower than the first threshold temperature. The second threshold temperature may be a second throttling temperature or a second shutdown temperature.

Figure 9:
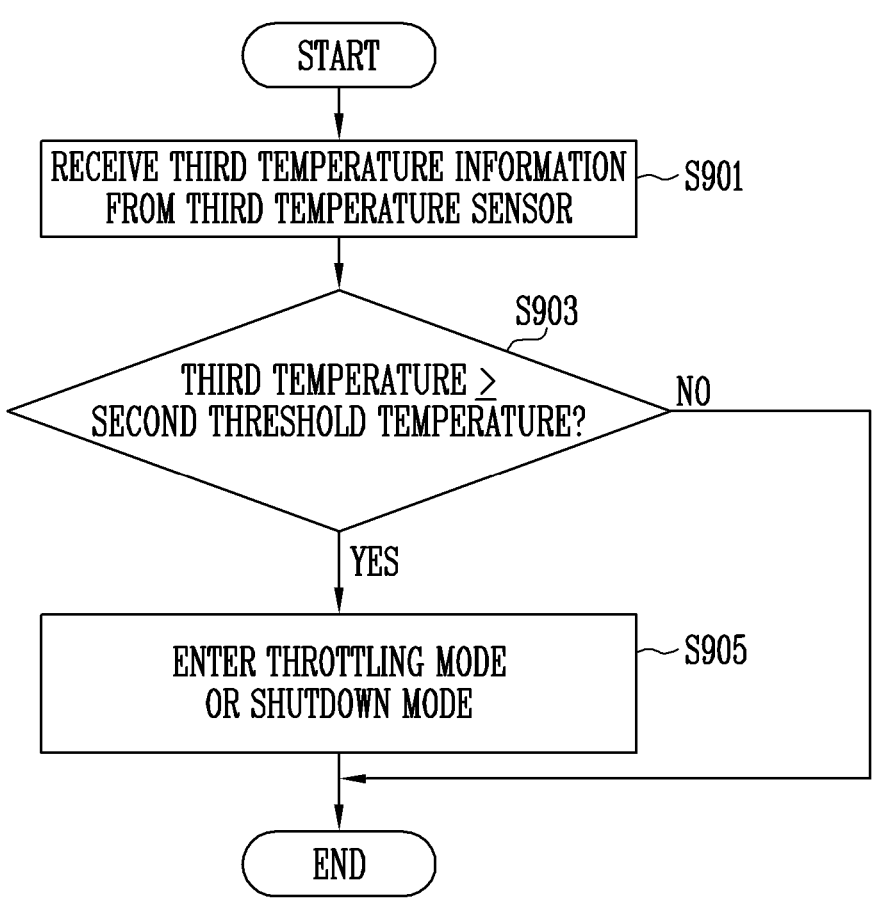
FIG. 9 is a diagram illustrating an operation of entering a mode in which internal temperature is controlled based on the temperature of any one storage device according to an embodiment of the disclosure.

FIG. 9 is a diagram illustrating an operation of entering a mode in which internal temperature is controlled based on the temperature of any one storage device according to an embodiment of the disclosure.

The steps illustrated in FIG. 9 may be performed after the threshold temperature has changed from the first threshold temperature to the second threshold temperature at step S707 of FIG. 7.

Referring to FIG. 9, at step S901, the third storage device 1300 may receive third temperature information including a third temperature from the third temperature sensor.

At step S903, the third storage device 1300 may compare the third temperature with the second threshold temperature. The second threshold temperature may be a second throttling temperature or a second shutdown temperature. The third storage device 1300 may not enter a throttling mode when the third temperature is lower than the second threshold temperature. The third storage device 1300 may not enter a shutdown mode when the third temperature is lower than the second threshold temperature. When the third temperature is equal to or higher than the second threshold temperature, step S905 may be performed.

At step S905, the third storage device 1300 enters the throttling mode or the shutdown mode when the third temperature is equal to or higher than the second threshold temperature.

Figure 10:
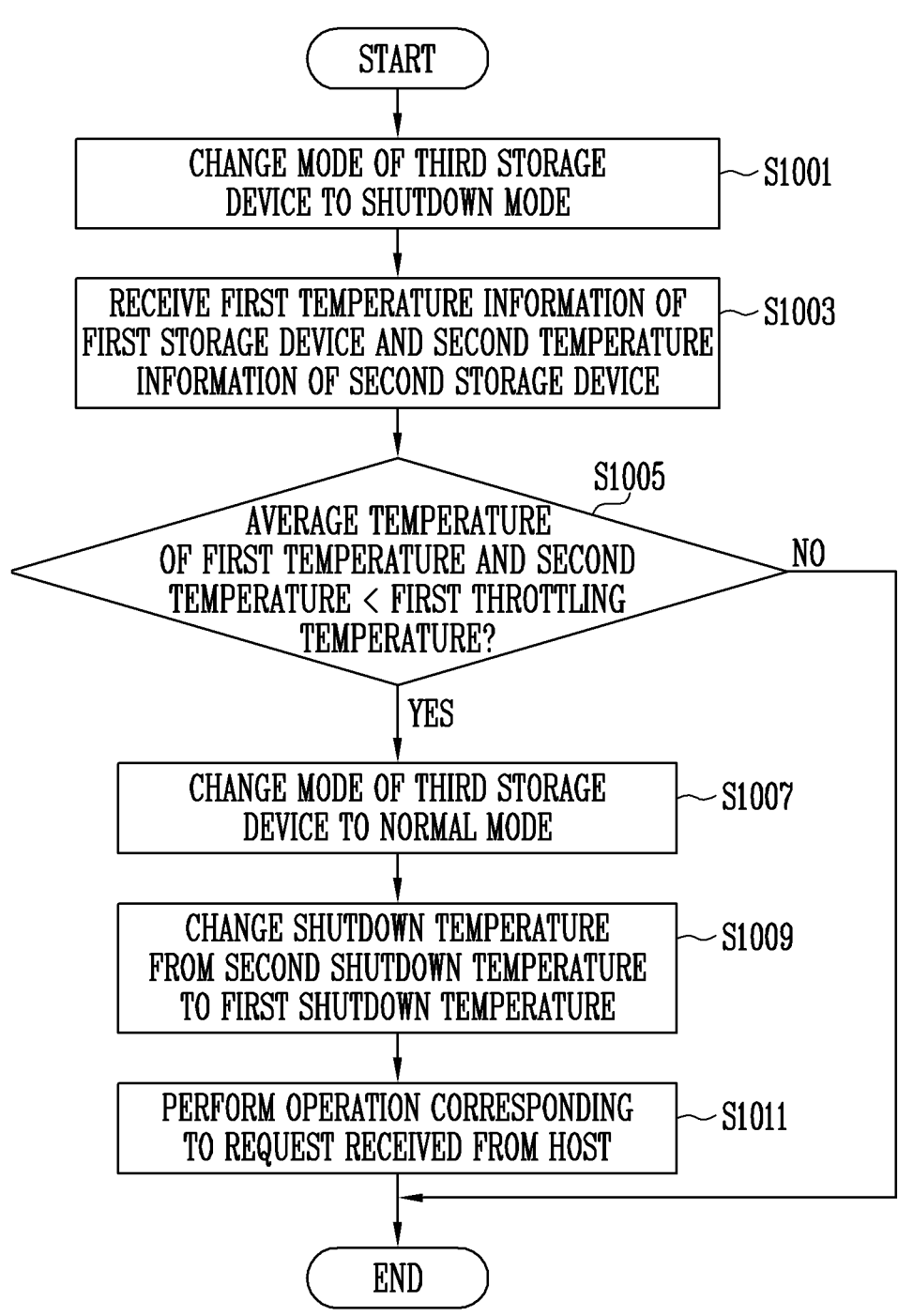
FIG. 10 is a diagram illustrating an operation of changing the mode of any one storage device based on the temperatures of a plurality of storage devices according to an embodiment of the disclosure.

FIG. 10 is a diagram illustrating an operation of changing the mode of any one storage device based on the temperatures of a plurality of storage devices according to an embodiment of the disclosure.

The steps illustrated in FIG. 10 may be performed after the third storage device has entered the shutdown mode at step S905 of FIG. 9.

At step S1001, the third storage device 1300 may change the mode of the third storage device 1300 to the shutdown mode.

At step S1003, the third storage device 1300 may receive first temperature information including a first temperature of the first storage device and second temperature information including a second temperature of the second storage device.

At step S1005, the third storage device 1300 may compare the average of the first temperature and the second temperature with first throttling temperature. The first throttling temperature may be the temperature at which the third storage device 1300 enters a throttling mode in which the internal temperature of the third storage device is controlled. The third storage device 1300 may maintain the shutdown mode when the average of the first temperature and the second temperature is equal to or higher than the first throttling temperature. When the average of the first temperature and the second temperature is lower than the first throttling temperature, step S1007 may be performed.

At step S1007, when the average temperature of the first temperature and the second temperature is lower than the first throttling temperature, the third storage device 1300 may change the mode of the third storage device from the shutdown mode to a normal mode.

At step S1009, the third storage device 1300 may change the shutdown temperature from the second shutdown temperature to the first shutdown temperature.

At step S1011, after the mode of the third storage device has changed to the normal mode, the third storage device 1300 may perform an operation corresponding to a request received from the host.

Figure 11:
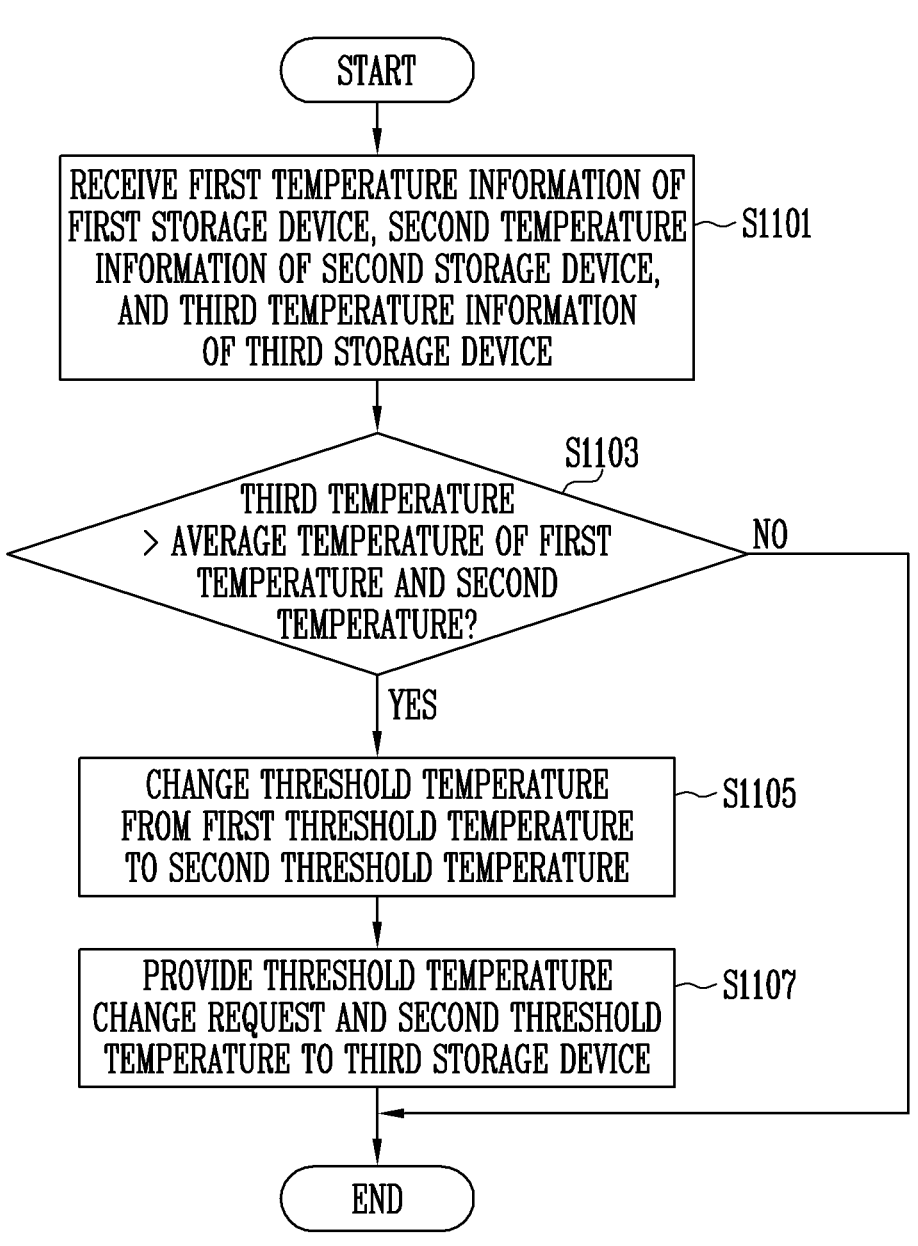
FIG. 11 is a flowchart illustrating an operation in which a host controls the temperature of any one storage device based on the temperatures of a plurality of storage devices according to an embodiment of the disclosure.

FIG. 11 is a flowchart illustrating an operation in which a host controls the temperature of any one storage device based on the temperatures of a plurality of storage devices according to an embodiment of the disclosure.

Referring to FIG. 11, at step S1101, a host 2000 may receive first temperature information including an internal temperature of the first storage device, second temperature information indicating an internal temperature of the second storage device, and third temperature information indicating an internal temperature of the third storage device.

At step S1103, the host 2000 may compare the third temperature of the third storage device with the average of the first temperature of the first storage device and the second temperature of the second storage device. The threshold temperature is not changed when the third temperature is lower than or equal to the average temperature of the first temperature and the second temperature. When the third temperature is higher than the average temperature of the first temperature and the second temperature, step S1105 may be performed.

At step S1105, the host 2000 may change the threshold temperature from the first threshold temperature to the second threshold temperature when the third temperature is higher than the average temperature of the first temperature and the second temperature.

At step S1107, the host 2000 may provide a threshold temperature change request and the second threshold temperature to the third storage device 1300. The third storage device 1300 may enter a throttling mode or a shutdown mode based on the result of comparing the third temperature with the second threshold temperature.

Figure 12:
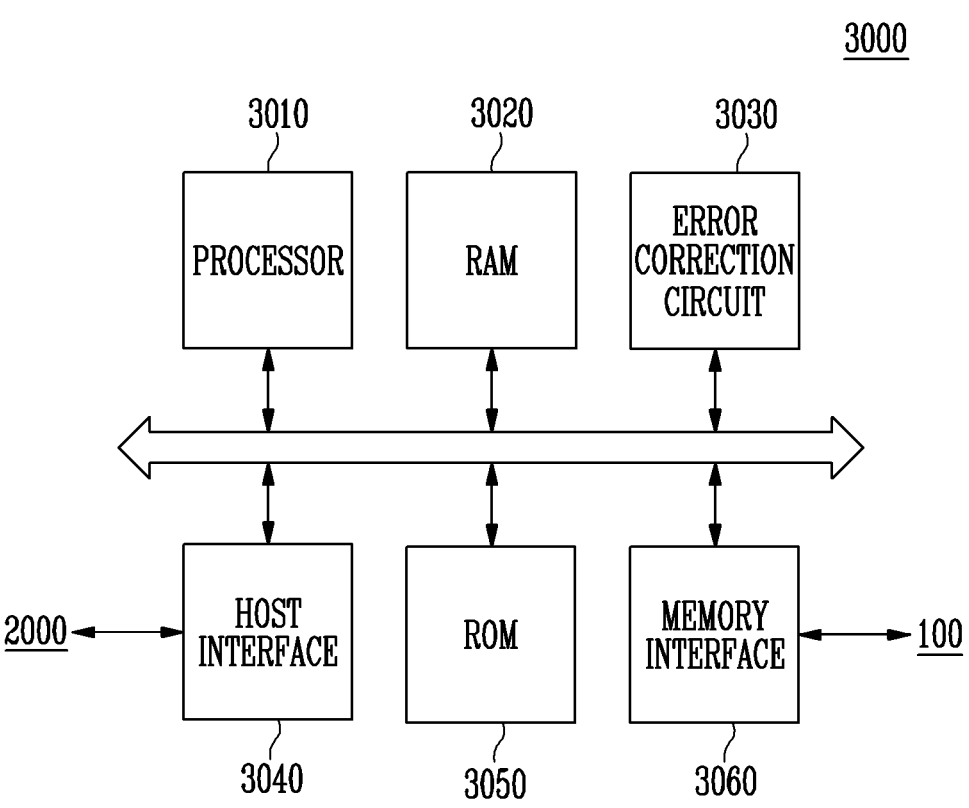
FIG. 12 is a diagram illustrating a memory controller according to embodiments of the disclosure.

FIG. 12 is a diagram illustrating a memory controller according to embodiments of the disclosure.

Referring to FIG. 12, a memory controller 3000 may include a processor 3010, a random access memory (RAM) 3020, an error correction circuit 3030, a host interface 3040, a read only memory (ROM) 3050, and a memory interface 3060. The memory controller 3000 illustrated in FIG. 12 may be a first memory controller 1110, a second memory controller 1210 or a third memory controller 1310 as illustrated in FIG. 1.

The processor 3010 may control the overall operation of the memory controller 3000. The processor 3010 may control the operation of the memory controller 3000 to store data requested by a host 2000 in a memory device 100. In an embodiment, the processor 3010 may include a threshold temperature determiner 1311 and a device temperature controller 1312, which are illustrated in FIG. 3. The processor 3010 may change a threshold temperature from a first threshold temperature to a second threshold temperature based on the result of comparing temperatures received from other storage devices with a temperature received from a temperature sensor in a storage device. When the temperature received from the temperature sensor is equal to or higher than the threshold temperature, the processor 3010 may control the storage device, which enters into a throttling mode or a shutdown mode.

The RAM 3020 may be used as a buffer memory, a cache memory or a working memory of the memory controller 3000.

The error correction circuit 3030 may perform error correction. The error correction circuit 3030 may perform error correction code (ECC) encoding based on data to be written to the memory device 100 through the memory interface 3060. The ECC-encoded data may be transferred to the memory device 100 through the memory interface 3060. The error correction circuit 3030 may perform ECC decoding on data received from the memory device 100 through the memory interface 3060. The memory device 100 may be the first memory device 1120, the second memory device 1220, or the third memory device 1320, described above with reference to FIG. 1.

The ROM 3050 may store various types of information required to operate the memory controller 3000 in the form of firmware. The memory controller 3000 may communicate with the external device (e.g., the host 2000, an application processor or the like) through the host interface 3040. The memory controller 3000 may be provided with data through the host interface 3040. In an embodiment, the host interface 3040 may receive a read request or a program request from the host 2000.

The memory controller 3000 may communicate with the memory device 100 through the memory interface 3060. The memory controller 3000 may transmit a command, an address, data or the like to the memory device 100 through the memory interface 3060. The memory interface 3060 may provide a command to the memory device 100 for performing an operation corresponding to the request of the host.

Figure 13:
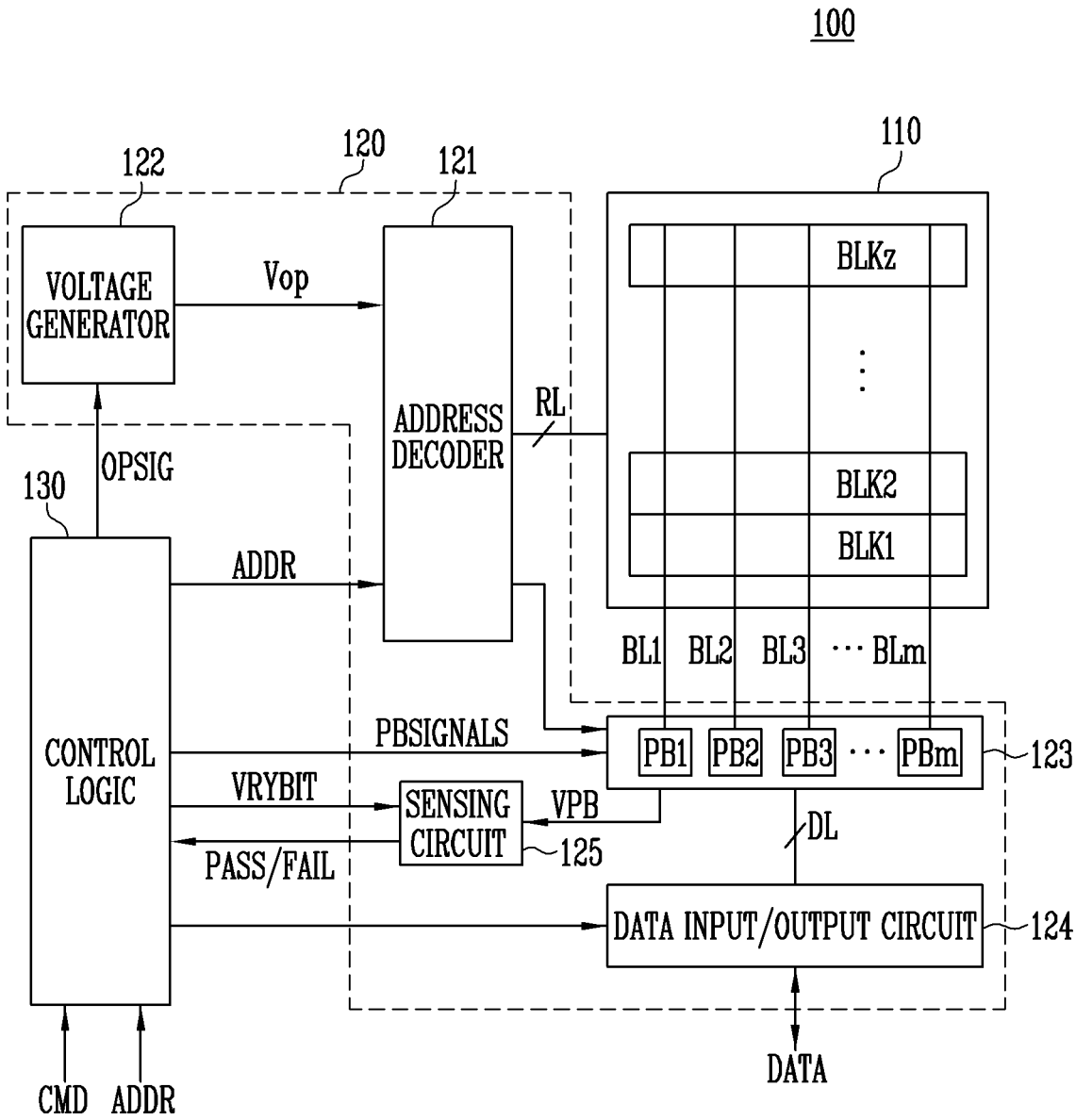
FIG. 13 is a diagram illustrating a memory device according to embodiments of the disclosure.

FIG. 13 is a diagram illustrating a memory device according to embodiments of the disclosure.

A memory device 100 illustrated in FIG. 13 may be a first memory device 1120, a second memory device 1220, or a third memory device 1320, which are described above with reference to FIG. 1. Referring to FIG. 13, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be coupled to an address decoder 121 through row lines RL. The plurality of memory blocks BLK1 to BLKz may be coupled to the page buffer group 123 through bit lines BL1 to BLm. Each of the memory blocks BLK1 to BLKz may include a plurality of memory cells. Memory cells coupled to the same word line, from among the plurality of memory cells, may be defined as one physical page. In an embodiment, a physical page may be the unit by which data is stored or by which stored data is read. One physical page may include a plurality of logical pages. A memory block may be the unit by which an erase operation is performed.

Each of the memory cells of the memory device 100 may be implemented as a single-level cell (SLC) capable of storing one bit of data, a multi-level cell (MLC) capable of storing two bits of data, a triple-level cell (TLC) capable of storing three bits of data, a quad-level cell (QLC) capable of storing four bits of data, or a memory cell capable of storing five or more bits of data.

The peripheral circuit 120 may drive the memory cell array 110. In an example, the peripheral circuit 120 may drive the memory cell array 110 to perform a program operation, a read operation, and an erase operation under the control of the control logic 130. In an example, the peripheral circuit 120 may apply various operating voltages to the row lines RL and the bit lines BL1 to BLm, or discharge the applied voltages, under the control of the control logic 130.

The peripheral circuit 120 may include the address decoder 121, a voltage generator 122, the page buffer group 123, a data input/output circuit 124, and a sensing circuit 125.

The address decoder 121 may be coupled to the memory cell array 110 through the row lines RL. The row lines RL may include drain select lines, word lines, source select lines, and a source line.

The address decoder 121 may be operated under the control of the control logic 130. The address decoder 121 may receive addresses ADDR from the control logic 130.

The address decoder 121 may decode a block address, from among the received addresses ADDR. The address decoder 121 may select at least one of the memory blocks BLK1 to BLKz according to the decoded block address. The address decoder 121 may decode a row address, from among the received addresses ADDR. The address decoder 121 may select at least one word line WL of the selected memory block by applying voltages supplied from the voltage generator 122 to the at least one word line WL according to the decoded row address.

During a program operation, the address decoder 121 may apply a program voltage to the selected word line and apply a pass voltage having a voltage level lower than that of the program voltage to unselected word lines. During a program verify operation, the address decoder 121 may apply a verify voltage to the selected word line and apply a verify pass voltage having a voltage level higher than that of the verify voltage to the unselected word lines.

During a read operation, the address decoder 121 may apply a read voltage to the selected word line and apply a read pass voltage having a voltage level higher than that of the read voltage to unselected word lines.

The address decoder 121 may decode a column address from among the received addresses ADDR. The decoded column address may be transferred to the page buffer group 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate various operating voltages Vop that are used for program, read, and erase operations in response to an operation signal OPSIG. For example, the voltage generator 122 may generate a plurality of erase voltages, a plurality of program voltages, a plurality of pass voltages, a plurality of select read voltages, and a plurality of unselect read voltages. The plurality of operating voltages Vop may be supplied to the memory cell array 110 by the address decoder 121.

The page buffer group 123 may include first to m-th page buffers PB1 to PBm. The first to m-th page buffers PB1 to PBm may be coupled to the memory cell array 110 through the first to m-th bit lines BL1 to BLm, respectively. The first to m-th page buffers PB1 to PBm may be operated under the control of the control logic 130.

The first to m-th page buffers PB1 to PBm may transmit/receive data DATA to/from the data input/output circuit 124. During a program operation, the first to m-th page buffers PB1 to PBm may receive data DATA through the data input/output circuit 124 and data lines DL.

During a program operation, the first to m-th page buffers PB1 to PBm may transfer data DATA, received through the data input/output circuit 124, to selected memory cells through the bit lines BL1 to BLm. The memory cells in the selected page may be programmed based on the received data DATA. Memory cells coupled to a bit line to which a program-enable voltage (e.g., a ground voltage) is applied may have increased threshold voltages. The threshold voltages of memory cells coupled to a bit line to which a program-inhibit voltage (e.g., a supply voltage) is applied may be maintained. During a verify operation, the first to m-th page buffers PB1 to PBm may read the data DATA stored in the selected memory cells from the selected memory cells through the bit lines BL1 to BLm.

During a read operation, the page buffer group 123 may read data DATA from the memory cells in the selected page through the bit lines BL1 to BLm, and may store the read data DATA in the first to m-th page buffers PB1 to PBm.

The data input/output circuit 124 may be coupled to the first to m-th page buffers PB1 to PBm through the data lines DL. The data input/output circuit 124 may be operated under the control of the control logic 130.

The data input/output circuit 124 may include a plurality of input/output buffers (not illustrated) that receive input data DATA. During a program operation, the data input/output circuit 124 may receive the data DATA from the memory controller. During a read operation, the data input/output circuit 124 may output the data DATA, received from the first to m-th page buffers PB1 to PBm included in the page buffer group 123, to the memory controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the page buffer group 123 with a reference voltage generated by the reference current. For example, the sensing circuit 125 may output the pass signal to the control logic 130 when the magnitude of the sensing voltage VPB is smaller than that of the reference voltage. In an example, the sensing circuit 125 may output the fail signal to the control logic 130 when the magnitude of the sensing voltage VPB is greater than that of the reference voltage.

The control logic 130 may be coupled to the address decoder 121, the voltage generator 122, the page buffer group 123, the data input/output circuit 124, and the sensing circuit 125. The control logic 130 may control the overall operation of the memory device 100. The control logic 130 may be operated in response to a command CMD transferred from an external device.

The control circuit 130 may control the peripheral circuit 120 by generating various types of signals in response to the command CMD and an address ADDR. For example, the control logic 130 may generate the operation signal OPSIG, the addresses ADDR, page buffer control signals PBSIGNALS, and the enable bit signal VRYBIT in response to the command CMD and the address ADDR. The control logic 130 may output the operation signal OPSIG to the voltage generator 122, may output the addresses ADDR to the address decoder 121, may output the page buffer control signals PBSIGNALS to the page buffer group 123, and may output the enable bit signal VRYBIT to the sensing circuit 125. In addition, the control logic 130 may determine whether a verify operation has passed or failed in response to the pass or fail signal PASS or FAIL output from the sensing circuit 125.

According to the present disclosure, there are provided a memory module in which storage devices share temperatures with each other, and a computing system including the memory module.

What is claimed is:

1. A memory module, comprising:
a first storage device connected to a host and including a first memory controller, a first memory device and a first temperature sensor that senses an internal temperature of the first storage device; and
a second storage device connected to the host and including a second memory controller, a second memory device and a second temperature sensor that senses an internal temperature of the second storage device, and configured to receive an information about the internal temperature of the first storage device,
wherein the second storage device configured to change a threshold temperature of the second storage device from a first threshold temperature to a second threshold temperature different from the first threshold temperature based on the information about the internal temperature of the first storage device, and
wherein the second storage device delays entry into a mode to control the internal temperature of the second storage device from a time when the second storage device reaches the first threshold temperature to a time when the second storage device reaches the second threshold temperature and regardless of whether the first storage device has entered a mode to control the internal temperature of the first storage device.

2. The memory module according to claim 1, wherein the second storage device is configured to, when the internal temperature of the second storage device is higher than the internal temperature of the first storage device, change the threshold temperature from the first threshold temperature to the second threshold temperature.

3. The memory module according to claim 2, wherein the second storage device is configured to, when the internal temperature of the second storage device is higher than the second threshold temperature, enter a throttling mode in which the internal temperature of the second storage device is controlled.

4. The memory module according to claim 2, wherein the second storage device is configured to add a difference between the internal temperature of the second storage device and the internal temperature of the first storage device as an offset to the first threshold temperature to result in the second threshold temperature.

5. The memory module according to claim 2, wherein the second storage device is configured to set the second threshold temperature as a difference between the internal temperature of the second storage device and the internal temperature of the first storage device added to the first threshold temperature or a maximum threshold temperature, whichever is lower.

6. The memory module according to claim 2, wherein after the threshold temperature has changed to the second threshold temperature, the second storage device is configured to change the threshold temperature from the second threshold temperature back to the first threshold temperature when the internal temperature of the second storage device drops below the first threshold temperature.

7. The memory module according to claim 2, wherein the second storage device is configured to, when the internal temperature of the second storage device is higher than the second threshold temperature, enter a shutdown mode in which the internal temperature of the second storage device is controlled.

8. The memory module according to claim 7, wherein the second storage device is configured to enter a throttling mode when the internal temperature of the second storage device reaches a throttling temperature threshold, which is lower than the second threshold temperature, and
wherein when the internal temperature of the first storage device is lower than the throttling temperature threshold, the second storage device is configured to change the mode of the second storage device from the shutdown mode to a normal mode.

9. The memory module according to claim 8, wherein the second storage device is configured to, after the mode has changed to the normal mode, change the threshold temperature from the second threshold temperature to the first threshold temperature.

10. The memory module according to claim 1, wherein the second threshold temperature is higher than the first threshold temperature.

11. A memory module, comprising:
a first storage device connected to a host and including a first memory controller, a first memory device and a first temperature sensor that senses an internal temperature of the first storage device; and
a second storage device connected to the host and including a second memory controller, a second memory device and a second temperature sensor that senses an internal temperature of the second storage device, and configured to receive an information about the internal temperature of the first storage device and to change, based on the information, a throttling temperature from a first throttling temperature to a second throttling temperature different from the first throttling temperature,
wherein the second storage device performs a throttling operation at the second throttling temperature, after the second storage device reaches the first throttling temperature and regardless of whether the first storage device performs a throttling operation.

12. The memory module according to claim 11, wherein the second storage device is configured to change the throttling temperature from the first throttling temperature to the second throttling temperature based on a result of comparing the internal temperature of the second storage device with the internal temperature of the first storage device.

13. The memory module according to claim 12, wherein the second storage device is configured to perform the throttling operation when the internal temperature of the second storage device is higher than the second throttling temperature.

14. The memory module according to claim 12, wherein the second storage device is configured to set the second throttling temperature at a temperature obtained by adding an offset temperature, which is a difference between the internal temperature of the second storage device and the internal temperature of the first storage device, to the first throttling temperature.

15. The memory module according to claim 12, wherein the second storage device is configured to set the second throttling temperature at the lower of a temperature, obtained by adding the internal temperature of the second storage device to an offset temperature that is a difference between the internal temperature of the second storage device and the internal temperature of the first storage device, and a maximum throttling temperature.

16. The memory module according to claim 12, wherein the second storage device is configured to, when the internal temperature of the second storage device becomes lower than the first throttling temperature after the throttling temperature has changed to the second throttling temperature, change the throttling temperature from the second throttling temperature to the first throttling temperature.

17. A computing system, comprising:

a first storage device including a first memory controller, a first memory device and a first temperature sensor that senses an internal temperature of the first storage device;

a second storage device different from the first storage device, including a second memory controller, a second memory device and a second temperature sensor that senses an internal temperature of the second storage device; and a host configured to receive temperature information indicating internal temperatures of the first and second storage devices and to provide a threshold temperature change request to the second storage device, wherein the threshold temperature change request is used to request a change of a threshold temperature at which the second storage device enters a mode to control the internal temperature of the second storage device, based on the internal temperature of the first storage device and regardless of whether the first storage device has entered a mode to control the internal temperature of the first storage device, wherein the change in the threshold temperature delays a time at which the second storage device enters a mode to control the internal temperature of the second storage device.

18. The computing system according to claim 17, wherein the host is configured to, when the internal temperature of the second storage device is higher than the internal temperature of the first storage device, provide the threshold temperature change request to the second storage device.

19. The computing system according to claim 17, wherein the second storage device is configured to change the threshold temperature from a first threshold temperature to a second threshold temperature different from the first threshold temperature in response to the threshold temperature change request.

20. The computing system according to claim 19, wherein the host is configured to provide a temperature obtained by adding the internal temperature of the second storage device to an offset temperature, which is a difference between the internal temperature of the second storage device and the internal temperature of the first storage device, as the second threshold temperature to the second storage device.

\* \* \* \* \*